US008732690B1

(12) United States Patent
Memmott

(10) Patent No.: US 8,732,690 B1
(45) Date of Patent: May 20, 2014

(54) COMPUTING DEVICE CONFIGURED FOR INSTALLING AN APPLICATION

(75) Inventor: James Lester Memmott, Draper, UT (US)

(73) Assignee: Crimson Corporation, Dover, DE (US)

( * ) Notice: Subject to any disclaimer, the term of this patent is extended or adjusted under 35 U.S.C. 154(b) by 221 days.

(21) Appl. No.: 13/283,298

(22) Filed: Oct. 27, 2011

(51) Int. Cl.
*G06F 9/445* (2006.01)

(52) U.S. Cl.
USPC ................. 717/174; 717/175; 717/177

(58) Field of Classification Search
USPC ................. 717/173–177; 709/203–204
See application file for complete search history.

(56) References Cited

U.S. PATENT DOCUMENTS

| | | | | |
|---|---|---|---|---|
| 5,938,778 | A * | 8/1999 | John et al. ................. | 714/45 |
| 6,775,830 | B1 * | 8/2004 | Matsunami et al. ........... | 717/176 |
| 7,284,243 | B2 * | 10/2007 | Burgess ................. | 717/175 |
| 7,398,524 | B2 * | 7/2008 | Shapiro ................. | 717/175 |
| 7,412,700 | B2 * | 8/2008 | Lari et al. ................. | 717/175 |
| 7,549,148 | B2 * | 6/2009 | Cross et al. ................. | 717/174 |
| 7,802,247 | B1 * | 9/2010 | Weathersby et al. ......... | 717/174 |
| 7,818,734 | B2 * | 10/2010 | Giannini et al. ............ | 717/168 |
| 7,823,135 | B2 * | 10/2010 | Horning et al. ............ | 717/127 |
| RE41,959 | E * | 11/2010 | Suzuki et al. ................. | 712/210 |
| 7,840,961 | B1 * | 11/2010 | Weathersby ................. | 717/177 |
| 7,913,248 | B1 * | 3/2011 | Lynch et al. ................. | 717/174 |
| 7,975,265 | B2 * | 7/2011 | Schnoebelen et al. ........ | 717/174 |
| 8,073,908 | B2 * | 12/2011 | Heins et al. ................. | 709/204 |
| 8,209,680 | B1 * | 6/2012 | Le et al. ................. | 717/174 |
| 8,341,620 | B2 * | 12/2012 | Criddle et al. ................. | 717/174 |
| 8,375,384 | B2 * | 2/2013 | Mahajan et al. ............. | 717/173 |
| 8,429,410 | B2 * | 4/2013 | Little et al. ................. | 713/175 |
| 8,448,166 | B2 * | 5/2013 | Nanda et al. ................. | 717/176 |
| 8,458,689 | B2 * | 6/2013 | Barman et al. ................. | 717/170 |
| 8,533,704 | B2 * | 9/2013 | Wookey ................. | 717/174 |
| 8,543,637 | B2 * | 9/2013 | Kent et al. ................. | 709/203 |

OTHER PUBLICATIONS

Herrick et al, "Sustainable Automated Software Deployment Practices", ACM, pp. 189-196, 2013.*
Conradi et al, "Version Models for Software Configuration Management", ACM Computing Surveys, vol. 30, No. 2, pp. 231-282, 1998.*
Hosek et al, "Safe Software Updates via Multi-version Execution", IEEE, pp. 612-621, 2013.*
Uribarren et al, "Middleware for Distributed Services and Mobile Applications", ACM, pp. 1-7, 2006.*

* cited by examiner

*Primary Examiner* — Anil Khatri
(74) *Attorney, Agent, or Firm* — Austin Rapp & Hardman

(57) ABSTRACT

A computing device configured for installing an application is described. The computing device includes a processor and instructions stored in memory that is in electronic communication with the processor. The computing device determines if an application instruction length is a first instruction length or a second instruction length. The first instruction length is shorter than the second instruction length. If the application instruction length is the first instruction length, then the computing device runs an application installer in a first instruction length mode. If the application instruction length is the second instruction length, then the computing device determines if an operating system instruction length is the first instruction length or the second instruction length. If the operating system instruction length is the second instruction length, then the computing device disables a compatibility module.

17 Claims, 8 Drawing Sheets

COMPUTING DEVICE CONFIGURED FOR INSTALLING AN APPLICATION

TECHNICAL FIELD

The present disclosure relates generally to computers and computer-related technology. More specifically, the present disclosure relates to a computing device for installing an application.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user. Computers are increasingly linked with other computers through networks.

The expansion of computer technology has led to an increase of computer diversity. Computers have become diverse in terms of hardware and software. For example, some software may run on some hardware and may not run on other hardware. Such diversity among computers may be beneficial for users desiring a broad range of computing options. However, the diversity of computers may be very challenging for computer management. As can be observed from this discussion, improved systems and methods for managing computers may be beneficial.

DETAILED DESCRIPTION

Figure 1:
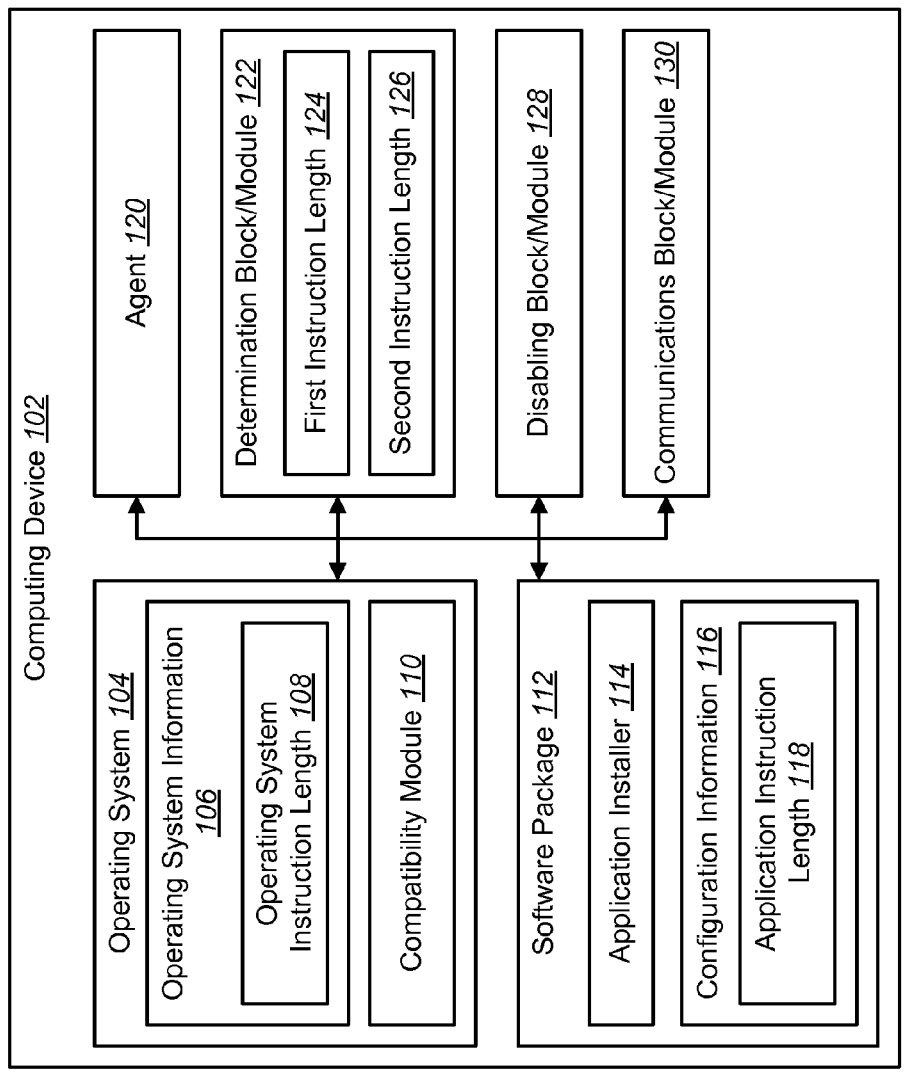
FIG. 1 is a block diagram illustrating one configuration of a computing device in which systems and methods for installing an application may be implemented.

A computing device configured for installing an application is described. The computing device includes a processor and instructions stored in memory that is in electronic communication with the processor. The computing device determines if an application instruction length is a first instruction length or a second instruction length. The first instruction length is shorter than the second instruction length. If the application instruction length is the first instruction length, then the computing device runs an application installer in a first instruction length mode. If the application instruction length is the second instruction length, then the computing device determines if an operating system instruction length is the first instruction length or the second instruction length. If the operating system instruction length is the second instruction length, then the computing device disables a compatibility module. If the application instruction length is the second instruction length, then the computing device runs the application installer in a second instruction length mode. The application installer and the application instruction length may be received from a second computing device.

The compatibility module may run an application in the first instruction length mode in an operating system that operates in the second instruction length mode. The first instruction length may be 32 bits. The second instruction length may be 64 bits. The computing device may also terminate and report an error when the application instruction length is the second instruction length and the operating system instruction length is the first instruction length.

The computing device may determine if the compatibility module has been disabled by another entity. If the compatibility module has been disabled by another entity, then the compatibility module is not disabled or enabled. Disabling the compatibility module may not comprise accessing a registry. The computing device may also enable the compatibility module after the application installer has run in the second instruction length mode.

A method for installing an application on a computing device is also described. The method includes determining if an application instruction length is a first instruction length or a second instruction length. The first instruction length is shorter than the second instruction length. The method also includes running an application installer in a first instruction length mode if the application instruction length is the first instruction length. If the application instruction length is the second instruction length, then the method includes determining if an operating system instruction length is the first instruction length or the second instruction length. The method includes disabling a compatibility module if the operating system instruction length is the second instruction length. The method further includes running the application installer in a second instruction length mode if the application instruction length is the second instruction length.

A non-transitory, tangible computer-readable medium for installing an application is additionally described. The computer-readable medium includes executable instructions for determining if an application instruction length is a first instruction length or a second instruction length. The first instruction length is shorter than the second instruction length. The computer-readable medium also includes executable instructions for running an application installer in a first instruction length mode if the application instruction length is the first instruction length. If the application instruction length is the second instruction length, then the computer-readable medium includes executable instructions for determining if an operating system instruction length is the first instruction length or the second instruction length. The computer-readable medium additionally includes executable instructions for disabling a compatibility module if the operating system instruction length is the second instruction length. The computer-readable medium also includes executable instructions for running the application installer in a second instruction length mode if the application instruction length is the second instruction length.

In software distribution management, system administrators deploy software to one or more computing devices through a variety of means including Windows Installer (MSI) files, custom executable (EXE) file installers, batch files, power shell files and script files. One of the challenges associated with software distribution management is that deployed software may be received by computing devices with different types of operating systems. Operating system (OS) vendors have extended the types of operating systems by supporting both 32-bit types and 64-bit types. In order to support older software, 64-bit operating systems support 32-bit applications through an abstraction layer to enable them to run correctly.

For instance, Microsoft implements "Windows 32-bit on Windows 64-bit" (WoW64) in the 64-bit versions of Windows to enable 32-bit applications to run. In short, WoW64 changes the way 32-bit applications view the resources on the system in such a way that enables them to run in a compatibility mode. For example, for 32-bit applications the OS maps the %SystemRoot%\System32 directory to the %SystemRoot%\SysWOW64 directory with the latter having 32-bit versions of standard applications including cmd.exe, regedit, PowerShell, cscript & wscript. The registry is also remapped for 32-bit applications so that access to HKEY_LOCAL_MACHINE\Software is rerouted to HKEY_LOCAL_MACHINE\Software\Wow6432Node.

Thus, 32-bit applications running on a 64-bit version of Windows will see the file system and registry differently due to features in WOW64 called file redirection and registry redirection. This file redirection and registry redirection may be problematic.

For example, if an application installer (e.g., batch file, powershell or script, etc.) is written to install a 64-bit application but is run as a 32-bit application on the 64-bit OS, then it will write to the registry at HKEY_LOCAL_MACHINE\Software\Wow6432Node\<VendorName>. However, the installed application will expect it to be at HKEY_LOCAL_MACHINE\Software\<VendorName>. Thus, the application installer may read and write to the wrong location in the registry when accessing HKEY_LOCAL_MACHINE\Software and may read and write files to the wrong location on the disk if accessing %SystemRoot%\System32.

In an ideal world the OS would implicitly determine that it should or should not run the application installer with file system redirect and registry redirect turned on or off. However, this may not be possible because it may be difficult to accurately determine what the batch file or script writer intended. Thus, it may be beneficial for the script writer's intent be explicitly defined.

Previous approaches for disabling the data redirect have required the deployment script to call into the Windows Management Instrumentation (WMI) layer of the Windows application programming interface (API) to access the registry. In doing so, the WMI layer bypasses the data redirect system. This method is limited to VBScript scripts and is not a suitable implementation for software distribution management programs that need to support other types of scripts and batch files. Moreover, the method using WMI requires a substantially greater amount of code to achieve the same purposes, making it more difficult for administrators to write and maintain these batch files and scripts.

Systems and methods for installing an application are disclosed. In one configuration, a computing device may receive a software package that includes an indicator if an application installer should be run as a 64-bit application or not. This may allow the computing device to correctly execute the application installer.

For example, one or more computing devices may receive a software package (e.g., a deployed software distribution package) for installing an application. The deployment process may be performed by a computing device receiving a software package and running an application installer. The software package may include an application installer, configuration information and any necessary data. In one configuration, the application installer includes one or more of a script (e.g., batch file, PowerShell script or some other script, etc.) and/or an executable file (e.g., MSI, EXE, etc.). The computing device may receive a software package that has been configured for deployment to different operating systems. In one example, a computing device may receive a software package that includes an indicator that the application installer is to be run as a 64-bit application. In some cases, the software package may be pushed or pulled to the client in some fashion for deployment. The computing device may load the software package including the configuration information. The computing device may read the configuration information to determine how the deployment should occur. If the computing device determines that the software package was not marked to be run as a 64-bit application, the computing device may run the application installer as a traditional 32-bit application. If the computing device determines that the software package was marked to be run as a 64-bit application, the computing device may check the operating system to see if it supports 64-bit application execution. If the computing device determines that the operating system supports 64-bit applications, the computing device may disable the WOW64 redirect features. The computing device may then execute the application installer. The computing device may then re-enable the WOW64 redirect features. Thus, the computing device may run the application installer in a fashion that is suitable for both 32-bit and 64-bit applications, which may be beneficial.

Previous approaches were limited to the execution of 32-bit applications because the WOW64 data redirection would causes issues. The systems and methods disclosed herein may be beneficial for allowing 32-bit execution as needed for backwards compatibility.

In one configuration, the computing device may determine if data redirection has already been disabled. If the computing device determines that data redirection had already been disabled, then there may not be a need to disable it again or to enable it after running the application installer. The computing device may preserve whether data redirection has already been disabled in a variable so that the data redirection may be re-enabled only if it had not been disabled previously. Making this determination may be beneficial if a plug-in or other 3rd party component has already disabled data redirect. Thus, data redirection may not be inadvertently re-enabled when it has already been disabled by another entity.

In another configuration, the computing device may determine that the software package was marked for 64-bit deployment, but was being deployed to a 32-bit OS. In this case, the computing device may determine that it should not run the software package as a 32-bit application. Instead, the computing device may stop the application installation process and indicate that an error has occurred. The computing device may additionally generate a report that the application installation process was terminated.

In another configuration, the computing device may generate detailed reports such as error and/or status reports. In some cases, these reports may be transmitted to the system administrator. These reports may help the computing device and/or the system administrator understand which code path was executed. These reports may also provide the computing device and/or the administrator with the information needed to take corrective action should the application installation process fail.

In some configurations, procedural steps and/or components may be interchanged to obtain logically equivalent results. For instance, they may be interchanged for performance reasons. If one is considered faster than the other, then it may come first. In one configuration, the systems and methods disclosed herein may be implemented in software. In another configuration, the systems and methods disclosed may be implemented in firmware or hardware logic. In yet another configuration, a combination of software, firmware and/or hardware may be used to implement the systems and methods disclosed.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a computing device 102 in which systems and methods for installing an application may be implemented. The computing device 102 may include an operating system 104, a software package 112, an agent 120, a determination block/module 122, a disabling block/module 128 and a communications block/module 130.

The operating system 104 may include operating system information 106 and a compatibility module 110. Examples of operating systems include Microsoft Windows operating systems, Linux operating systems, UNIX operating systems, Mac OS operating systems, BSD operating systems, Android operating systems, BlackBerry OS operating systems, iOS operating systems, Symbian operating systems, QNX operating systems, etc. The operating system information 106 may included information about the operating system (e.g., name, version, type, etc.). The operating system information 106 may include an operating system instruction length 108. The operating system length 108 may be the word size of the operating system instructions (e.g., 16 bits, 32 bits, 64 bits, 128 bits, etc.).

The compatibility module 110 may allow an operating system with one word size (e.g., 64 bits) to properly run an application with a different word size (e.g., 32 bits). For example, the compatibility module 110 may be an abstraction layer and/or subsystem. In one example, the compatibility module 110 may be "Windows 32-bit on Windows 64-bit" (WoW64). WoW64 provides a 32-bit environment and interface for allowing 32-bit applications to run unmodified on a 64-bit system. WoW64 may redirect data and registry keys to create the 32-bit environment. In another example, the compatibility module 110 may be an instruction set tailored to handle 32-bit instructions on a 64-bit system. Although the example provided describes a compatibility module 110 for running 32-bit applications in a 64-bit system, the compatibility module 110 may be used for many different instruction word lengths (e.g., 32 bits on 128-bit systems, 64 bits on 128-bit systems, etc.).

The software package 112 may include an application installer 114 and configuration information 116. The application installer 114 may install an application onto the computing device 102. The application installer 114 may include one or more of a script (e.g., batch file, PowerShell script or some other script, etc.) and/or an executable file (e.g., MSI, EXE, etc.). In one configuration, the application installer 114 may allow for an unattended install (the application installer 114 may install the application on the computing device 102 without any interaction from a user, for example). In another configuration, the application installer 114 includes a deployment script that may run upon deployment of the software package 112 to the computing device 102. For example, another computing device (e.g., administrative system, server, etc.) may deploy a software package 112 (e.g., software distribution package) to the computing device 102. In another example, the configuration, the software package 112 may be preexisting on the computing device 102 and/or received from a storage device.

The configuration information 116 may be used for configuring the software package 112 and/or the application installer 114. The configuration information 116 may include an application instruction length 118. The application instruction length 118 may be the word size of the application instructions (e.g., 16 bits, 32 bits, 64 bits, 128 bits, etc.).

The agent 120 may be used to manage and/or perform operations on the computing device 102. For example, the agent 120 may receive and perform instructions from an administrative system. For instance, the agent 120 may receive a software package 112 that was deployed to it from the administrative system. In other instances, the agent 120 may uninstall software, eliminate threats (e.g., viruses, Trojans, worms, malware, adware, spyware, etc.), report information to the administrative system (e.g., usage reports, status, etc.), update firmware, etc. This may be done according to instructions received from the administrative system, for example.

The determination block/module 122 may determine an instruction length (e.g., the length of an instruction) for a piece of software. Examples of instruction length include 8 bits, 16 bits, 32 bits, 64 bits, 128 bits, etc. An instruction length may be an indicated value. For example, instruction length may be indicated by a string value, an integer value, a sample instruction, a bit sequence, a signal, a source code, a Boolean, or some other indicator. The determination block/module 122 may include data regarding a first instruction length 124 (e.g., 16 bits, 32 bits, 64 bits, etc.) and data regarding a second instruction length 126 (e.g., 32 bits, 64 bits, 128 bits, etc.). The first instruction length 124 may be shorter than the second instruction length 126. The computing device 102 may determine an instruction length based on an instruction length indicator and the data regarding the first instruction length 124 and/or the data regarding the second instruction length 126. For example, the determination block/module 122 may determine an instruction length is a first instruction length 124 by comparing an instruction length indicator (e.g., a string value of 32-bits) with data regarding a first instruction length 124 (e.g., a string value of 32-bits) and with data regarding a second instruction length 126 (e.g., a string value of 64-bits). In another example, the determination block/module 122 may determine an instruction length is a second instruction length 126 by making a function call (a query if the software is 64-bit, for example) to the software to obtain an instruction length indicator (e.g., a Boolean value of True) and comparing the instruction length indicator with data regarding a first instruction length 124 (e.g., a Boolean value of False) and with data regarding a second instruction length 126 (e.g., a Boolean value of True). Thus, the determination block/module 122 may determine that an instruction length (of an operating system 104 and/or an application, for example) is a first instruction length 124 (e.g., 32 bits) or a second instruction length 126 (e.g., 64 bits).

The determination block/module 122 may make other determinations. For example, the determination block/module 122 may determine whether the compatibility module 110 is disabled by another entity such as another application. For example, the determination block/module 122 may make a function call to the operating system that returns a Boolean value that indicates if the compatibility module 110 is enabled or disabled.

The disabling block/module 128 may disable the compatibility module 110. For example, the disabling block/module 128 may make a function call that disables the compatibility module 110. In another example, the disabling block/module 128 may send a signal that disengages the compatibility module 110. In one configuration, the disabling block/module 128 may disable the compatibility module 110 using a script (batch file, PowerShell script or some other script, etc.). In one configuration, the disabling block/module 128 may disable the compatibility module 110 without calling into the WMI layer of windows (without using a VBScript to access the registry, for example). In some configurations, the disabling block/module 128 may enable the compatibility module 110.

The communications block/module 130 may be used to communicate with one or more computing devices (e.g., administrative system, server, computing device, etc.). For example, the communications block/module 130 may format and/or send messages to another computing device. Additionally or alternatively, the communications block/module 130 may receive messages from the one or more computing devices.

The operating system 104, software package 112, agent 120, determination block/module 122, disabling block/module 128 and communications block/module 130 may be implemented in software, firmware or hardware and/or some combination of the three.

Figure 2:
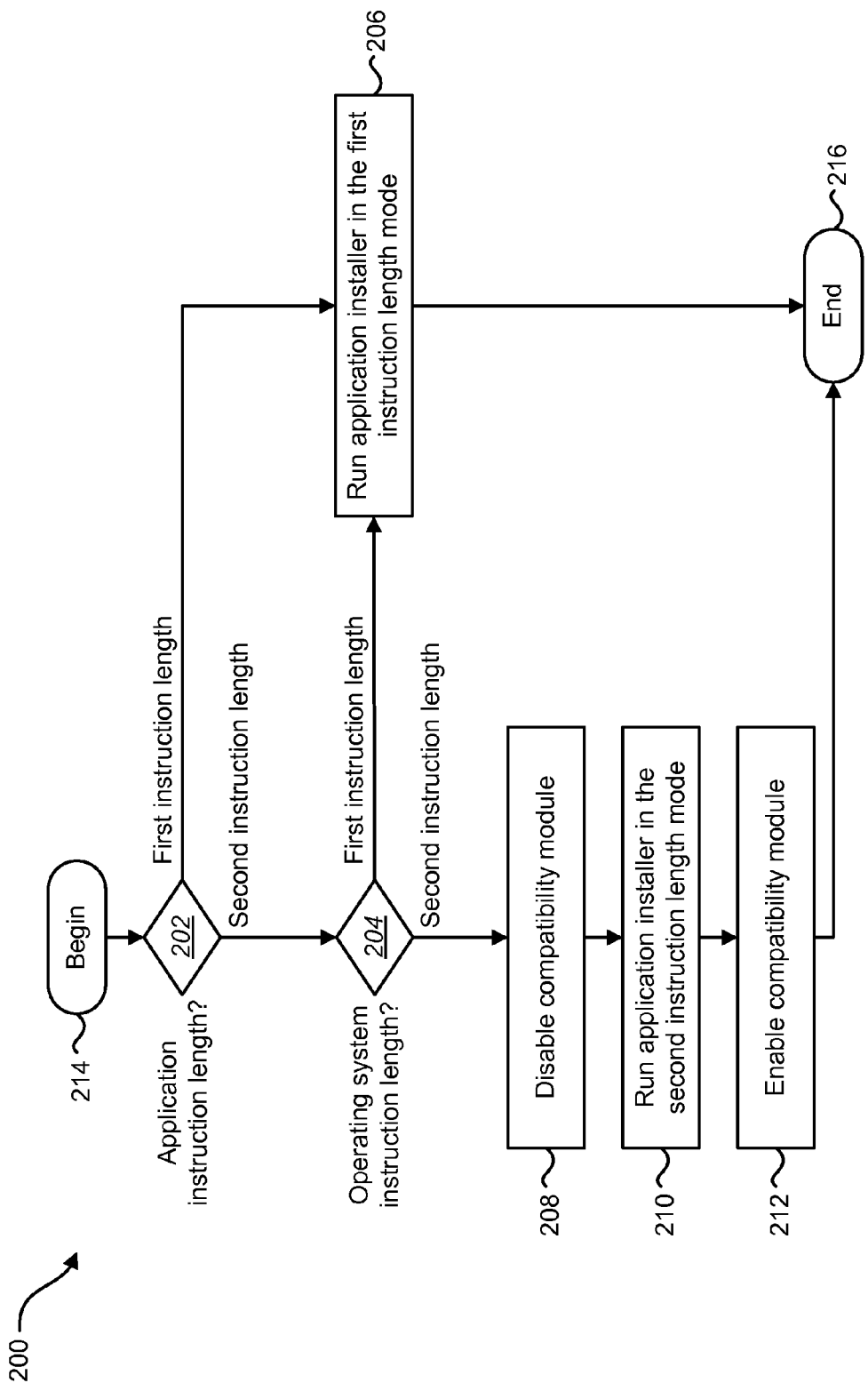
FIG. 2 is a flow diagram illustrating one configuration of a method for installing an application.

FIG. 2 is a flow diagram illustrating one configuration of a method 200 for installing an application. In some configurations, method 200 may be performed by an agent 120 running on the computing device 102.

The computing device 102 may begin 214 operation by determining 202 whether an application instruction length 118 is a first instruction length 124 or a second instruction length 126. In one configuration the determination block/module 122 may determine whether the application instruction length 118 is a first instruction length 124 or a second instruction length 126. In one example, the computing device 102 may receive a software package 112 with the application instruction length 118 indicated as the first instruction length 124. In this case, the determination block/module 122 may determine 202 that the application instruction length 118 is the first instruction length 124.

If the computing device 102 determines 202 that the application instruction length 118 is the first instruction length 124, then the computing device 102 may run 206 the application installer 114 in a first instruction length mode. In one configuration, (when the operating system instruction length 108 is the first instruction length 124, for example) the first instruction length mode may be a native mode of the operating system (e.g., the application instruction length 118 and the operating system instruction length 108 are the same length). In another configuration, (when the operating system instruction length 108 is the second instruction length 126, for example) the first instruction length mode may be a compatibility mode provided through the compatibility module 110 (e.g., the application instruction length 118 may be the first instruction length 124 and the operating system instruction length 108 may be the second instruction length 126). Operation may end 216 after running 206 the application installer 114 in the first instruction length mode.

In another example, the computing device may receive a software package with the application instruction length 118 indicated as the second instruction length 126. In this case, the determination block/module 122 may determine 202 that the application instruction length 118 is the second instruction length 126.

If the computing device 102 determines 202 that the application instruction length 118 is the second instruction length 126, then the computing device 102 may determine 204 whether an operating system instruction length 108 is a first instruction length 124 or a second instruction length 126. In one example, the operating system instruction length 108 may be the first instruction length 124. In this case, the determination block/module 122 may determine 204 that the operating system instruction length 108 is the first instruction length 124. If the computing device 102 determines 204 that the operating system instruction length 108 is the first instruction length 124, then the computing device 102 may run 206 the application installer 114 in the first instruction length mode as described previously. In another example, the operating system instruction length 108 may be the second instruction length 126. In this case, the determination block/module 122 may determine 204 that the operating system instruction length 108 is the second instruction length 126.

If the computing device 102 determines 204 that the operating system instruction length 108 is the second instruction length 126, then the computing device 102 may disable 208 the compatibility module. In one configuration, the disabling block/module 128 may be used to disable 208 the compatibility module 110. Disabling 208 the compatibility module 110 may comprise disengaging the compatibility module 110. For example, the compatibility module 110 may be disengaged so that if an application indicated as a first instruction length (e.g., 32-bit) application is run while the compatibility module 110 is disengaged, the application will not use the compatibility module 110. For instance, the application will run in the second instruction length mode (e.g., native mode, 64-bit mode) and will not be run in the first instruction length mode (e.g., compatibility mode, 32-bit mode).

The computing device 102 may run 210 the application installer 114 in the second instruction length mode. In this case, when the application instruction length 118 and the operating system instruction length 108 are both the second instruction length 126, the application installer 114 may run 210 in the native mode of the operating system (according to the second instruction length in this instance).

In one configuration, operation may end 216 after running 210 the application installer 114 in the second instruction length mode. In another configuration, the computing device 102 may optionally enable 212 the compatibility module 110. In one configuration, the disabling block/module 128 may be used to enable 212 the compatibility module 110. Enabling 212 the compatibility module 110 may comprise engaging and/or re-engaging the compatibility module 110. For example, the compatibility module 110 may be engaged so that if an application indicated as a first instruction length (e.g., 32-bit) application is run while the compatibility module 110 is engaged, then the application will use the compatibility module 110. For instance, the application will run in the first instruction length mode (e.g., compatibility mode, 32-bit mode) and will not be run in the second instruction length mode (e.g., native mode, 64-bit mode). Operation may end 216 after enabling 212 the compatibility module 110.

Figure 3:
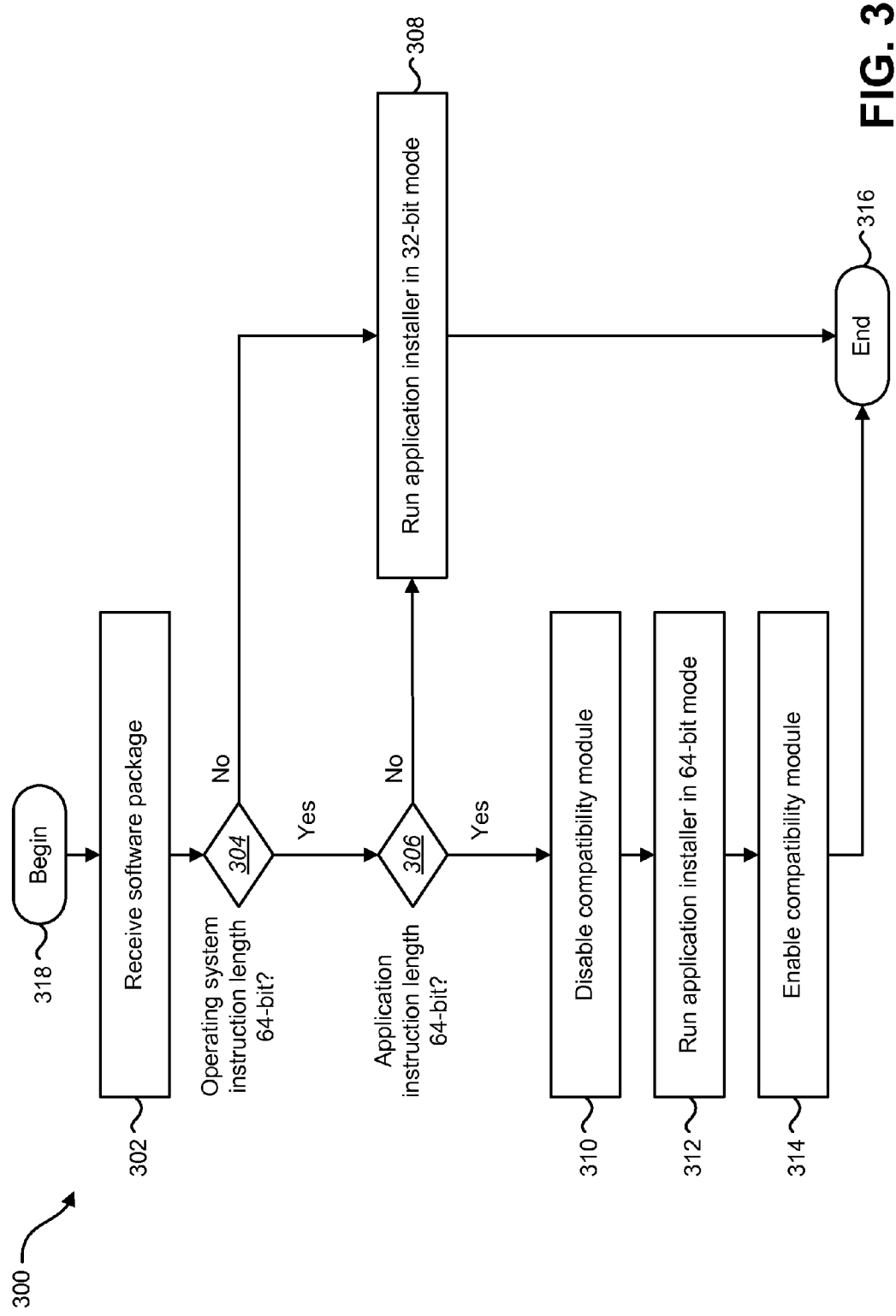
FIG. 3 is a flow diagram illustrating another configuration of a method for installing an application.

FIG. 3 is a flow diagram illustrating another configuration of a method 300 for installing an application. In some configurations, method 300 may be performed by an agent 120 running on the computing device 102.

The computing device 102 may begin 318 operation by receiving 302 a software package 112 (e.g., software distribution package). In one configuration, the communications block/module 130 may be used to receive 302 the software package 112. For example, the communications block/module 130 may receive 302 the software package 112 from another computing device (e.g., an administrative system).

The computing device 102 may determine 304 whether an operating system instruction length 108 is 64 bits. Determining 304 whether an operating system instruction length 108 is 64 bits may be similar to determining 204 an operating system instruction length as illustrated in FIG. 2. In one example, the operating system instruction length 108 may be 32 bits. In this case, the determination block/module 122 may determine 304 that the operating system instruction length 108 is not 64 bits.

If the computing device 102 determines 304 that the operating system instruction length 118 is not 64 bits, then the computing device 102 may run 308 the application installer 114 in a 32-bit mode. Running 308 the application installer in 32-bit mode may be similar to running 206 the application installer in the first instruction length mode as illustrated in FIG. 2. Operation may end 316 after running 308 the application installer 114 in the 32-bit mode.

In another example, the operating system instruction length 108 may be 64 bits. In this case, the determination block/module 122 may determine 304 that the operating system instruction length 108 is 64 bits.

If the computing device 102 determines 304 that the operating system instruction length 108 is 64 bits, then the computing device 102 may determine 306 whether an application instruction length is 64 bits. Determining 306 whether an application instruction length 118 is 64 bits may be similar to determining 202 whether an application instruction length is a first instruction length or a second instruction length as illustrated in FIG. 2. In one example, the computing device 102 may receive a software package 112 with the application instruction length 118 indicated as 32 bits. In this case, the determination block/module 122 may determine 306 that the application instruction length 118 is not 64 bits.

If the computing device 102 determines 306 that the application instruction length 118 is not 64 bits, then the computing device 102 may run 308 the application installer 114 in the 32-bit mode step described previously. In another example, the computing device 102 may receive a software package 112 with the application instruction length 118 indicated as 64 bits. In this case, the determination block/module 122 may determine 306 that the application instruction length 118 is 64 bits.

It should be noted that steps of determining the operating system instruction length and the application instruction length may be interchanged. For example, as illustrated in FIG. 2, the application instruction length 118 may be determined 202 before the operating system instruction length 108 may be determined 204. In contrast, as illustrated in FIG. 3, the operating system instruction length 108 may be determined 304 before the application instruction length 118 may be determined 306.

If the computing device 102 determines 306 that the application instruction length 118 is 64 bits, then the computing device 102 may disable 310 the compatibility module 110. Disabling 310 the compatibility module 110 may be similar to the step of disabling 208 the compatibility module 110 as illustrated in FIG. 2. The computing device 102 may run 312 the application installer 114 in 64-bit mode. Running 312 the application installer 114 in 64-bit mode may be similar to running 210 the application installer 114 in the second instruction length mode as illustrated in FIG. 2.

The computing device 102 may enable 314 the compatibility module 110. In one configuration, the disabling block/module 128 may be used to enable 314 the compatibility module 110. Enabling 314 the compatibility module 110 may comprise engaging and/or re-engaging the compatibility module 110. For example, the compatibility module 110 may be engaged so that if an application indicated as a first instruction length (e.g., 32-bit) application is run while the compatibility module 110 is engaged, then the application will use the compatibility module 110. For instance, the application will run in the first instruction length mode (e.g., compatibility mode, 32-bit mode) and will not be run in the second instruction length mode (e.g., native mode, 64-bit mode). Operation may end 316 after enabling 314 the compatibility module 110.

Figure 4:
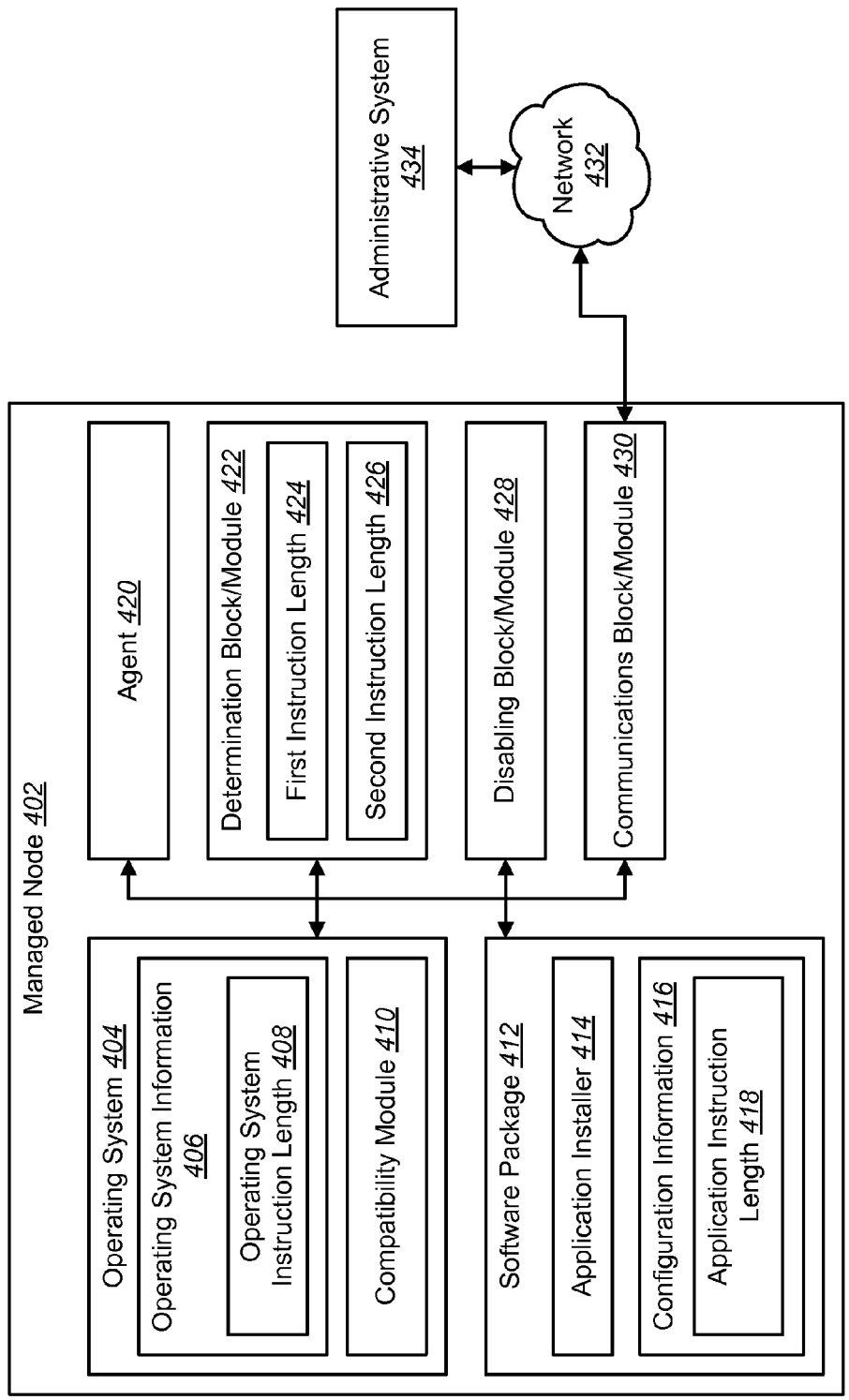
FIG. 4 is a block diagram illustrating another configuration of a computing device in which systems and methods for installing an application may be implemented.

FIG. 4 is a block diagram illustrating another configuration of a computing device in which systems and methods for installing an application may be implemented. The managed node 402 may be a computing device that is managed by an administrative system 434. The administrative system 434 may be a computing device that is configured for managing managed nodes (e.g., managed node 402). Examples of managing a managed node include powering on, powering off, restarting, installing an application, removing an application, performing software updates, performing firmware updates, transferring files to/from the managed node, monitoring, inventorying, controlling, directing operation, etc. The managed node 402 may be similar to the computing device 102 illustrated in FIG. 1. The managed node 402 may include an agent 420 (e.g., resident agent) that allows the managed node 402 to be managed by the administrative system 434.

The managed node 402 may include an operating system 404, a software package 412, a determination block/module 422, a disabling block/module 428 and a communications block/module 430. The operating system 404 may be similar to the operating system 104 described previously. The operating system 404 may include operating system information 406 and a compatibility module 410. The operating system information 406 may include an operating system instruction length 408. The operating system information 406 may be similar to the operating system information 106 described previously. The operating system instruction length 408 may be similar to the operating system instruction length 108 described previously. The compatibility module 410 may be similar to the compatibility module 110 described previously.

The software package 412 may be similar to the software package 112 described previously. The software package 412 may include an application installer 414 and configuration information 416. Configuration information 416 may include an application instruction length 418. The application installer 414 may be similar to application installer 114 described previously. Configuration information 416 may be similar to configuration information 116 described previously. Application instruction length 418 may be similar to application instruction length 118 described previously.

The determination block/module 422 may be similar to the determination block/module 122 described previously. The determination block/module 422 may include data regarding a first instruction length 424 and data regarding a second instruction length 426. The first instruction length 424 may be similar to the first instruction length 124 described previously and the second instruction length 426 may be similar to the second instruction length 126 described previously. Data regarding an instruction length may refer to an instruction length (e.g., 8-bit, 16-bit, 32-bit, 64-bit, 128-bit, etc.). In some cases, there may be additional and/or different instruction lengths (e.g., where the first is 32 bits and the second is 128 bits, where the first is 64 bits and the second is 128 bits, where the first is 128 bits and the second is 32 bits, etc.).

The disabling block/module 428 may be similar to the disabling block/module 128 described previously. The communications block/module 430 may be similar to the communications block/module 130 described previously. The communications block/module 430 may be coupled to a network 432. Examples of the network 432 include personal area networks, local area networks, wide area networks, etc. The network 432 may couple the managed node 402 to the administrative system 434.

In one configuration, the communications block/module 430 may receive a software package 412. In another configuration, the communications block/module 430 may send status reports to the administrative system 434. For example, the communications block/module 430 may send a report on the status of the application installation process.

Figure 5:
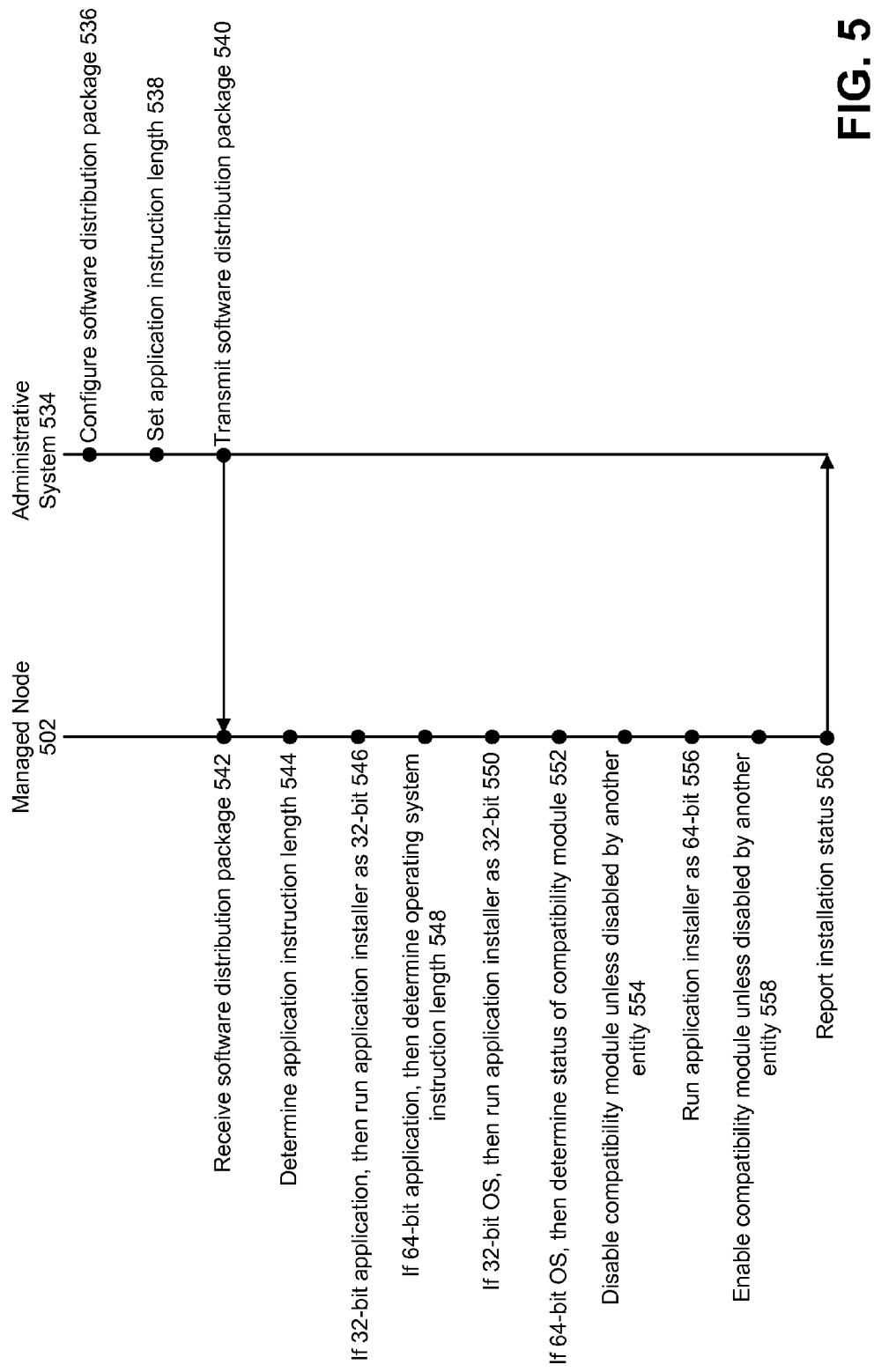
FIG. 5 is a thread diagram illustrating one configuration of installing an application.

FIG. 5 is a thread diagram illustrating one configuration of installing an application. The thread diagram may include an administrative system 534 and a managed node 502. The administrative system 534 may be similar to the administrative system 434 described previously. The managed node 502 may be similar to the managed node 402 described previously.

The administrative system 534 may configure 536 a software package 412 (e.g., software distribution package). Configuring 536 the software package 412 may include configuring the application installer 414 and/or configuring the configuration information 416. For example, the administrative system 534 may receive and/or determine application instruction length 418 information and add that information to the software package 412 (the information may be added to a configuration file included in the software package 412, for example).

The administrative system 534 may set 538 the application instruction length 418. In one configuration, the application instruction length 418 is set 538 as part of the configuration 536 of the software package 412. In one configuration, the administrative system may receive a manually entered value indicating the application instruction length 418 information. In another configuration, the administrative system may automatically determine the application instruction length 418 information based on the application. In yet another configuration, the administrative system may determine the application instruction length 418 information based on a file or resource that indicates an application instruction length 418. The application instruction length 418 may be included in configuration information 416 of the software package 412. For example, the application instruction length 418 may be added to a configuration file included in the software package 412.

The administrative system 534 may transmit 540 the software package 412 to the managed node 502. For example, a software package 412 may include a script (e.g., a deployment script) that configures the computing device and executes an executable file of the program to be run (e.g., an application installer, utility program, etc.). For instance, a software package 412 may be a software distribution package for Microsoft Office 2010 Professional 64-bit that includes a deployment script and an executable file that installs Microsoft Office 2010 Professional 64-bit. In one configuration, the software distribution package may be transmitted 540 across a network 432. The managed node 502 may receive 542 the software distribution package (e.g., software package 412).

The managed node 502 may determine 544 the application instruction length 418. Determining 544 the application instruction length 418 may be similar to determining 202 the application instruction length 118 as illustrated in FIG. 2. If the application instruction length 418 is determined 544 to be 32 bits, then the application installer 414 is run 546 in 32-bit mode. Running 546 in 32-bit mode may be similar to one or more of running 206, 308. If the application instruction length 418 is determined 544 to be 64 bits, then the operating system instruction length 408 is determined 548. Determining 548 the operating system instruction length 408 may be similar to determining 204 the operating system instruction length 108 as illustrated in FIG. 2. If the operating system instruction length 408 is determined 548 to be 32 bits, then the application installer 414 is run 550 in 32-bit mode. Running 550 in 32-bit mode may be similar to running 546 in 32-bit mode described previously. If the operating system instruction length 408 is determined 548 to be 64 bits, then the status of the compatibility module 410 is determined 552.

Determining 552 the status of the compatibility module 410 may comprise determining 552 whether the compatibility module 410 is enabled or disabled. In some cases, another entity may change the status (e.g., enable, disable) of the compatibility module 410. The compatibility module 410 is disabled 554 unless the compatibility module 410 was disabled by another entity. For example, if the status of the compatibility module 410 is enabled, then the compatibility module 410 will be disabled 554. However, if the status of the compatibility module 410 is disabled, then the compatibility module 410 will not be disabled 554.

The managed node 502 may run 556 the application installer 414 in 64-bit mode. Running 556 in 64-bit mode may be similar to running 312 in 64-bit mode as illustrated in FIG. 3. Following the running 556 of the application installer 414 in 64-bit mode, the managed node 502 may enable 558 the compatibility module 410 unless disabled by another entity. For example, if the compatibility module 410 was disabled 554, then the compatibility module 410 may be enabled 558. However, if the status of the compatibility module 410 is disabled (e.g., disabled by another entity) then the compatibility module 410 may not be enabled 558.

The managed node 502 may report 560 the installation status of the software distribution package. In some configurations, the report may be generated at the end of the application installation process. In other configurations, one or more reports may be generated and reported 560 throughout the application installation process. In one configuration, a result of one or more of the determinations is reported 560 as the determinations occur. The installation status may be reported 560 to the administrative system 534.

Figure 6:
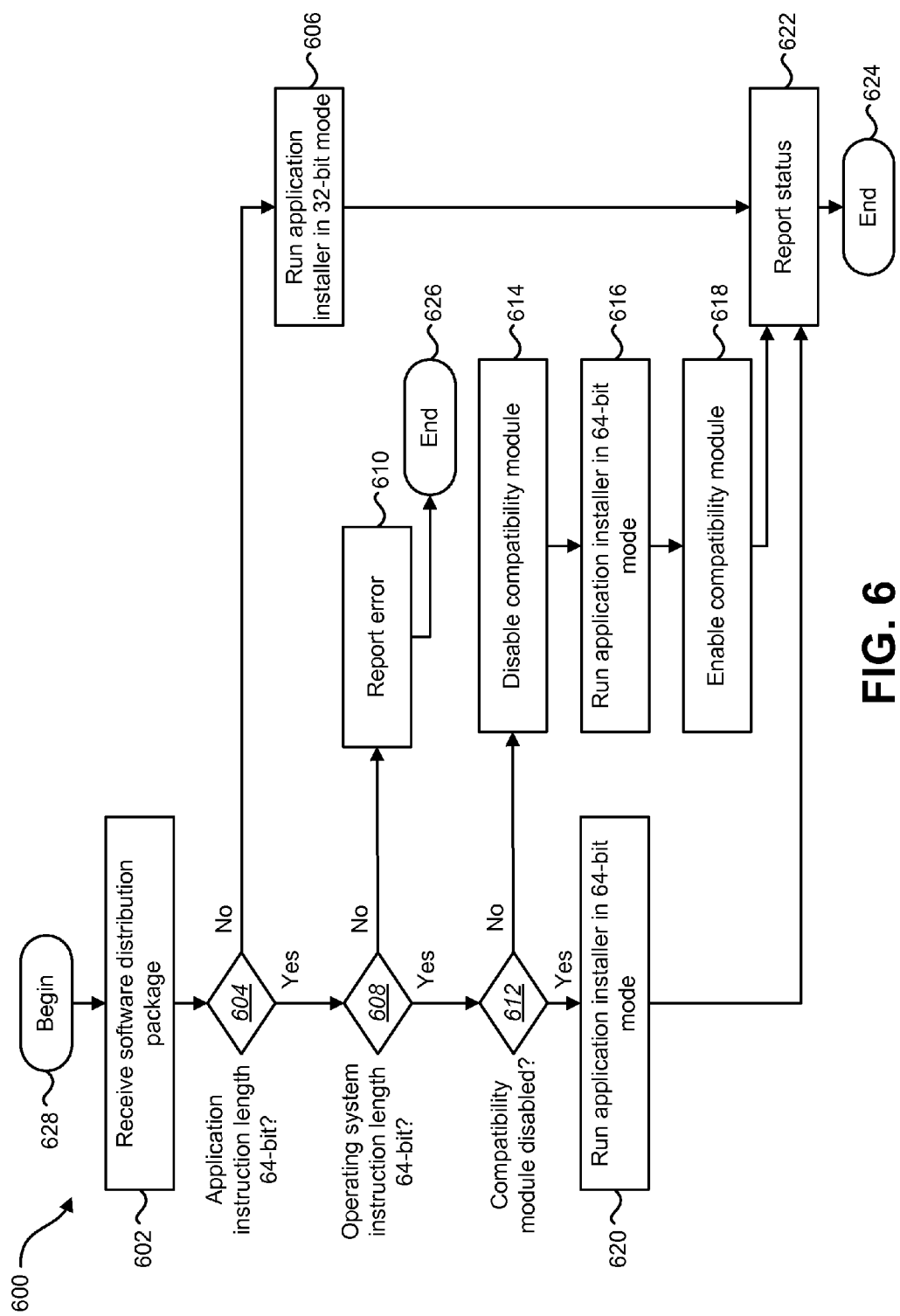
FIG. 6 is a flow diagram illustrating another configuration of a method for installing an application.

FIG. 6 is a flow diagram illustrating another configuration of a method 600 for installing an application. In some configurations, method 600 may be performed by an agent 420 running on the managed node 402.

The managed node 402 may begin 628 operation by receiving 602 a software package 412 (e.g., software distribution package). Receiving 602 a software package 412 may be similar to receiving 302 a software package as illustrated in FIG. 3. For example, the managed node 402 may receive 602 a software package 412 from an administrative system 434. The software package 412 received 602 from the administrative system 434 may include an application installer 414 and an application instruction length 418 (e.g., 32 bits, 64 bits, etc.).

The managed node 402 may determine 604 whether the application instruction length 418 is 64 bits. Determining 604 whether an application instruction length 418 is 64 bits may be similar to determining 306 whether an application instruction length is 64 bits as illustrated in FIG. 3. In one example, the computing device 402 may receive 602 a software package 412 with the application instruction length 418 indicated as 32 bits. In this case, the determination block/module 422 may determine 604 that the application instruction length 418 is not 64 bits.

If the computing device determines 604 that the application instruction length 418 is not 64 bits, then the computing device 102 may run 606 the application installer 414 in the 32-bit mode. Running 606 the application installer 414 in 32-bit mode may be similar to running 308 the application installer 114 in the 32-bit mode as illustrated in FIG. 3. The managed node 402 may report 622 the application installation status after running 606 the application installer 414 in 32-bit mode. For example, the managed node 402 may transmit a report to the administrative system 434 about the results of the application installation process. For instance, the report may include the determinations of any decision blocks and any logs associated with any operations. Operation may end 624 after reporting 622 the status of the application installation process.

In another example, the computing device 402 may receive 602 a software package 412 with the application instruction length 418 indicated as 64 bits. In this case, the determination block/module 422 may determine 604 that the application instruction length 418 is 64 bits.

If the managed node 402 determines 604 that the application instruction length 418 is 64 bits, then the managed node 402 may determine 608 whether the operating system instruction length 408 is 64 bits. Determining 608 whether an operation system instruction length 408 is 64 bits may be similar to determining 304 whether an operating system instruction length 108 is 64 bits as illustrated in FIG. 3. In one example, the operating system instruction length 408 may be 32 bits. In this case, the determination block/module 422 may determine 608 that the operating system instruction length 408 is not 64 bits.

If the managed node 402 determines 608 that the operating system instruction length 408 is not 64 bits, then the managed node 402 may report 610 an error. The managed node 402 may send a report 610 to the administrative system 434 indicating that an error (e.g., the software package 412 is attempting to install a 64-bit application on a 32-bit operating system) has occurred. Operation may end 626 after reporting 610 the error. In another example, the operating system instruction length 408 may be 64 bits. In this case, the determination block/module 422 may determine 608 that the operating system instruction length 408 is 64 bits.

If the managed node 402 determines 608 that the operating system instruction length 408 is 64 bits, then the managed node 402 may determine 612 whether the compatibility module 410 is disabled. For example, the determination block/module 422 may determine 612 whether the compatibility module 410 is disabled. In one example, the compatibility module 410 has not been disabled. In this case, the determination block/module 422 may determine 612 that the compatibility module 410 has not been disabled.

If the managed node 402 determines 612 that the compatibility module 410 has not been disabled, then the managed node 402 may disable 614 the compatibility module 410. Disabling 614 the compatibility module 410 may be similar to the step of disabling 310 the compatibility module 110 as illustrated in FIG. 3. The managed node 402 may run 616 the application installer 414 in 64-bit mode. Running 616 the application installer 414 in 64-bit mode may be similar to running 312 the application installer 114 in 64-bit mode as illustrated in FIG. 3. The managed node 402 may enable 618 the compatibility module 410. Enabling 618 the compatibility module 410 may be similar to enabling 314 the compatibility module 110 as illustrated in FIG. 3. The managed node 402 may report 622 the application installation status as described previously after enabling 618 the compatibility module 410.

In another example, the compatibility module 410 has been disabled (e.g., by another entity). In this case, the determination block/module 422 may determine 612 that the compatibility module 410 has been disabled. If the managed node 402 determines 612 that the compatibility module 410 has been disabled, then the managed node 402 may run 620 the application installer 414 in 64-bit mode. Running 620 the application installer 414 in 64-bit mode may be similar to running 312 the application installer 114 in 64-bit mode as illustrated in FIG. 3. The managed node 402 may report 622 the application installation status as described previously after running 620 the application installer 414 in 64-bit mode.

In some configurations, the managed node 402 may additionally report the results of the determination steps (e.g., 604, 608, 612) and/or errors to the administrative system 434. For example, the managed node 402 may report to the administrative system 434 that the compatibility module 410 was disabled (e.g., determined 612 to be disabled). In another example, the managed node 402 may report to the administrative system 434 that an error occurred during the disabling 614 of the compatibility module 410. Reports may be used by the managed node 402 and/or the administrative system 434 to overcome errors and/or for reporting purposes. In some case, the reports are made at the time of the determinations and/or errors to improve the error response time.

Figure 7:
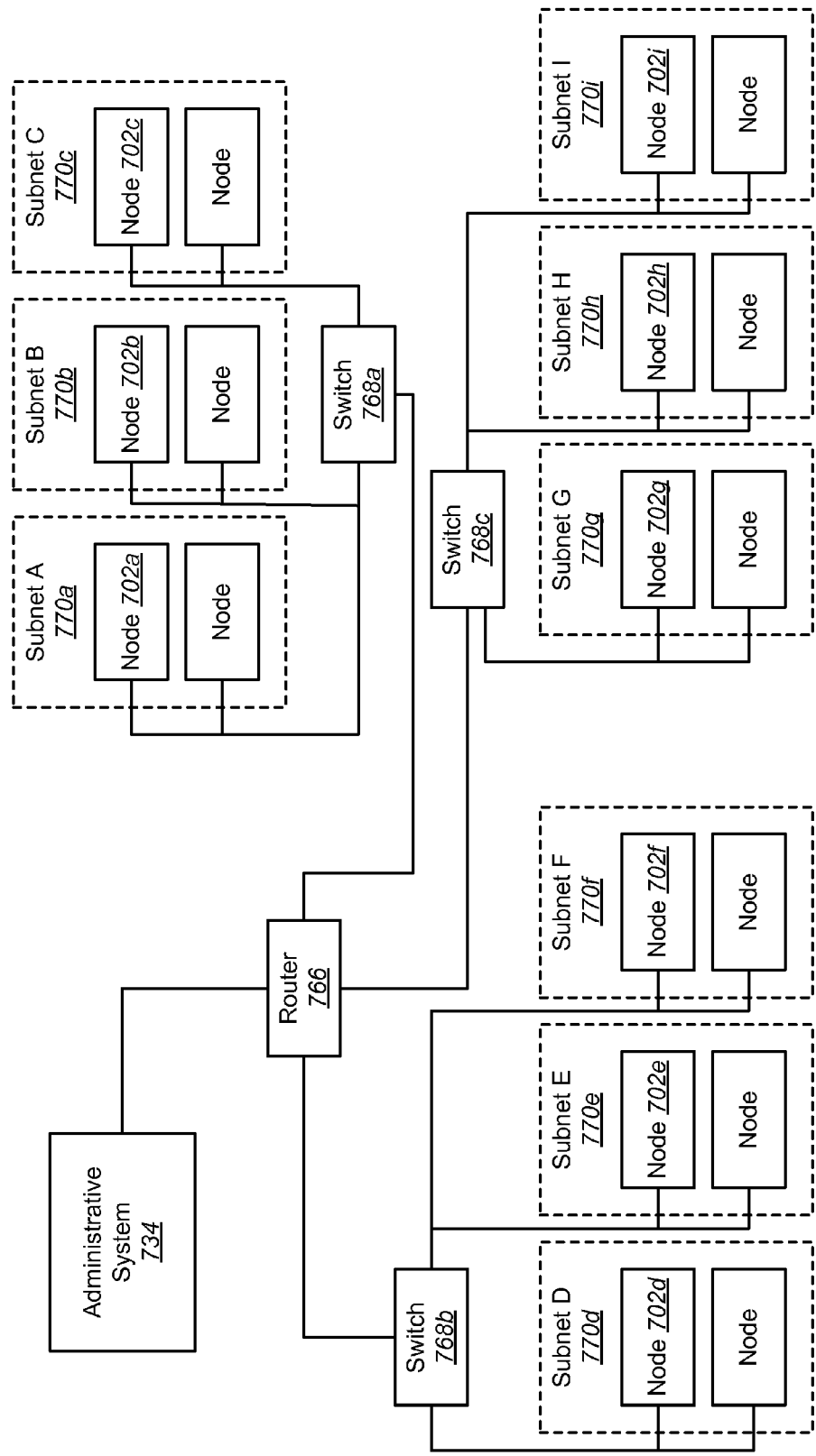
FIG. 7 is a block diagram that illustrates one configuration of a network where systems and methods for installing an application may be implemented.

FIG. 7 is a block diagram that illustrates one configuration of a network where systems and methods for installing an application may be implemented. An administrative system 734 is connected to a router 766. The router 766 is connected to switches 768*a*, 768*b*, 768*c*. Switch 768*a* is connected to several nodes 702*a*, 702*b*, 702*c*, etc., via their respective subnets 770*a*, 770*b*, 770*c*. The switch 768*b* is connected to several nodes 702*d*, 702*e*, 702*f*, etc., via their respective subnets 770*d*, 770*e*, 770*f*. The switch 768*c* is connected to several nodes 702*g*, 702*h*, 702*i*, etc., via their respective subnets 770*g*, 770*h*, 770*i*. In FIG. 7, the nodes 702 may be, for example, managed computing devices. Although FIG. 7 only shows one router 766, and a limited number of switches 768, subnets 770, and nodes 702, many and varied numbers of routers 766, switches 768, subnets 770, and nodes 702 may be included in networks and/or systems where systems and methods for determining a group based on a relationship on a computing device may be implemented.

Figure 8:
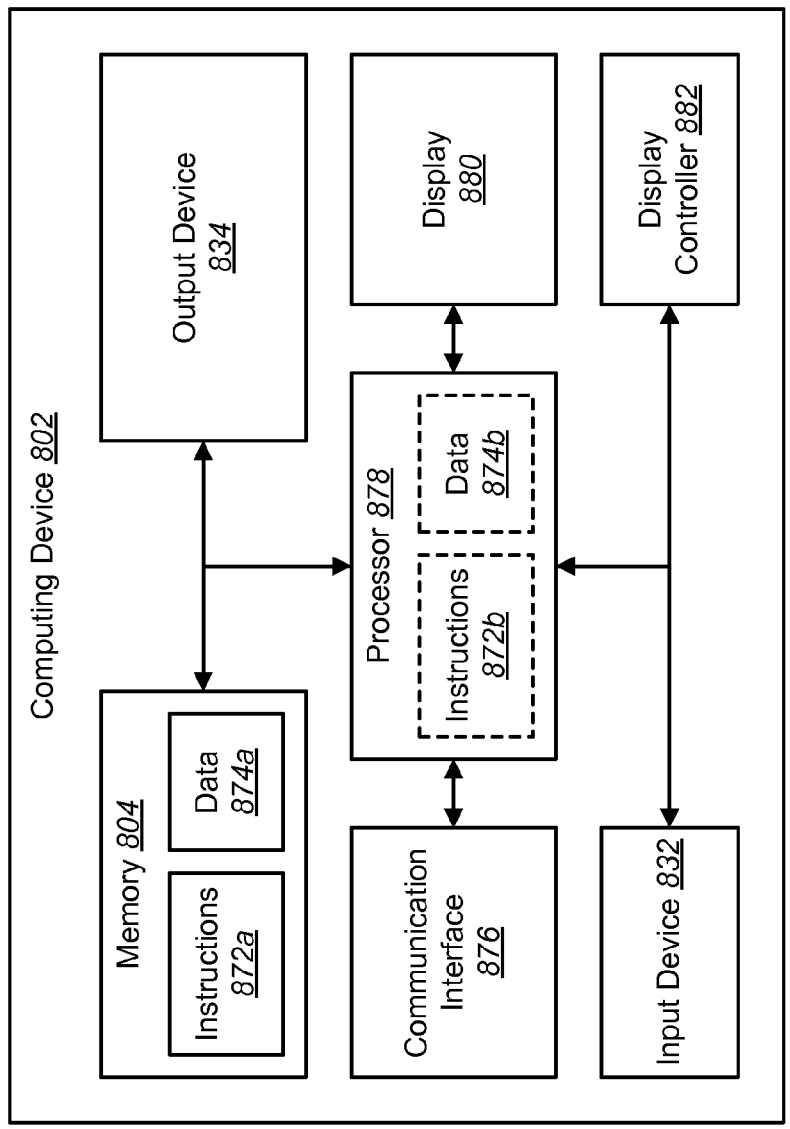
FIG. 8 illustrates various components that may be utilized on a computing device.

FIG. 8 illustrates various components that may be utilized on a computing device 802. The computing device 102, managed computing device(s) 402, 502, 702 and/or administrative systems 434, 534, 734 described above may be configured similar to the computing device 802 illustrated in FIG. 8. For example, the computing device 802 may be configured to perform one or more of the methods 200, 300, 600 described above. The illustrated components may be located within the same physical structure or in separate housings or structures.

The computing device 802 may include a processor 878 and memory 804. The processor 878 controls the operation of the computing device 802 and may be embodied as a microprocessor, a microcontroller, a digital signal processor (DSP) or other device known in the art. The memory 804 may include instructions 872a and data 874a. The processor 878 typically performs logical and arithmetic operations based on program instructions 872a and data 874a stored within the memory 804. That is, instructions 872b and data 874b may be stored and/or run on the processor 878.

The computing device 802 typically may include one or more communication interfaces 876 for communicating with other electronic devices. The communication interfaces 876 may be based on wired communication technology, wireless communication technology, or both. Examples of different types of communication interfaces 876 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 802 typically may include one or more input devices 832 and one or more output devices 834. Examples of different kinds of input devices 832 include a keyboard, mouse, microphone, remote control device, button, joystick, trackball, touchpad, lightpen, etc. Examples of different kinds of output devices 834 include a speaker, printer, etc. One specific type of output device which may be typically included in a computer system is a display device 880. Display devices 880 used with embodiments disclosed herein may utilize any suitable image projection technology, such as a cathode ray tube (CRT), liquid crystal display (LCD), light-emitting diode (LED), gas plasma, electroluminescence, or the like. A display controller 882 may also be provided, for converting data stored in the memory 804 into text, graphics, and/or moving images (as appropriate) shown on the display device 880.

Of course, FIG. 8 illustrates only one possible configuration of a computing device wherein systems and methods for determining a group based on a relationship may be performed. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

As used herein, the term "agent" and other variations thereof may refer to software and/or hardware that is used to manage and/or perform operations on a managed computing device. For example, the agent may receive and perform instructions from an administrative system. For instance, the agent may install software, uninstall software, eliminate threats (e.g., viruses, Trojans, worms, malware, adware, spyware, etc.), report information to the administrative system (e.g., usage reports, status, etc.), update firmware, detect unauthorized use, detect unauthorized products on the managed computing device, etc.

As used herein, the term "coupled" and other variations thereof may mean that one element is connected to another element directly or indirectly. For example, if a first element is coupled to a second element, the first element may be connected directly to the second element or may be connected to the second element through another element.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. It should be noted that the instructions described herein may be executable instructions.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. It should be noted that a computer-readable medium may be non-transitory and tangible. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method(s). The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device configured for installing an application, comprising:
   a processor;
   a memory in electronic communication with the processor;
   instructions stored in the memory, the instructions being executable to:
      determine whether an application instruction length is one of a first instruction length and a second instruction length, wherein the first instruction length is shorter than the second instruction length;
      run an application installer on the computing device in a first instruction length mode if the application instruction length is the first instruction length, and if the application instruction length is the second instruction length, then:
         determine whether an operating system instruction length is one of the first instruction length and the second instruction length;
         disable a compatibility module on the computing device if the operating system instruction length is the second instruction length; and
         run the application installer on the computing device in a second instruction length mode;
         wherein the application installer and the application instruction length are received from a second computing device.

2. The computing device of claim 1, wherein the first instruction length is 32 bits.

3. The computing device of claim 1, wherein the second instruction length is 64 bits.

4. The computing device of claim 1, wherein the compatibility module runs an application in the first instruction length mode in an operating system that operates in the second instruction length mode.

5. The computing device of claim 1, wherein the instructions are further executable to enable the compatibility module after the application installer has run in the second instruction length mode.

6. The computing device of claim 1, wherein the instructions are further executable to determine if the compatibility module has been disabled by another entity, and if the compatibility module has been disabled by another entity, then the compatibility module is not disabled and not enabled.

7. The computing device of claim 1, wherein the instructions are further executable to terminate and report an error when the application instruction length is the second instruction length and the operating system instruction length is the first instruction length.

8. The computing device of claim 1, wherein disabling the compatibility module does not comprise accessing a registry.

9. A method for installing an application on a computing device, comprising:
   reading instructions from a memory of a computing device, wherein the memory is in electronic communication with a processor;
   executing the instructions to perform the following:
   determining whether an application instruction length is one of a first instruction length and a second instruction length, wherein the first instruction length is shorter than the second instruction length;
   running an application installer on the computing device in a first instruction length mode if the application instruction length is the first instruction length, and if the application instruction length is the second instruction length, then:
      determining whether an operating system instruction length is one of the first instruction length and the second instruction length;
      disabling a compatibility module on the computing device if the operating system instruction length is the second instruction length; and
      running the application installer on the computing device in a second instruction length mode;
      wherein the application installer and the application instruction length are received from a second computing device.

10. The method of claim 9, wherein the first instruction length is 32 bits.

11. The method of claim 9, wherein the second instruction length is 64 bits.

12. The method of claim 9, wherein the compatibility module runs an application in the first instruction length mode in an operating system that operates in the second instruction length mode.

13. The method of claim 9, wherein the method further comprises enabling the compatibility module after the application installer has run in the second instruction length mode.

14. The method of claim 9, wherein the method further comprises determining if the compatibility module has been disabled by another entity, and if the compatibility module has been disabled by another entity, then the compatibility module is not disabled and not enabled.

15. The method of claim 9, wherein the method further comprises terminating and reporting an error when the application instruction length is the second instruction length and the operating system instruction length is the first instruction length.

16. The method of claim 9, wherein disabling the compatibility module does not comprise accessing a registry.

17. A non-transitory, tangible computer-readable storage medium for installing an application, comprising executable instructions for:
   determining whether an application instruction length is one of a first instruction length and a second instruction length, wherein the first instruction length is shorter than the second instruction length;
   running an application installer on a computing device in a first instruction length mode if the application instruction length is the first instruction length, and if the application instruction length is the second instruction length, then:
      determining whether an operating system instruction length is one of the first instruction length and the second instruction length;
      disabling a compatibility module on the computing device if the operating system instruction length is the second instruction length; and
      running the application installer on the computing device in a second instruction length mode;

wherein the application installer and the application instruction length are received from a second computing device.

\* \* \* \* \*

UNITED STATES PATENT AND TRADEMARK OFFICE
CERTIFICATE OF CORRECTION

| | | |
|---|---|---|
| PATENT NO. | : 8,732,690 B1 | Page 1 of 1 |
| APPLICATION NO. | : 13/283298 | |
| DATED | : May 20, 2014 | |
| INVENTOR(S) | : James Lester Memmott | |

It is certified that error appears in the above-identified patent and that said Letters Patent is hereby corrected as shown below:

In the Specification

Column 1, line 49 delete "implemented:" and replace it with --implemented;--.
Column 5, line 45 delete "included" and replace it with --include--.
Column 5, line 48 delete "system length" and replace it with --system instruction length--.

Signed and Sealed this
Fourth Day of November, 2014

Michelle K. Lee
*Deputy Director of the United States Patent and Trademark Office*